US005768791A

United States Patent [19]

V

[11] Patent Number: 5,768,791

[45] Date of Patent: Jun. 23, 1998

[54] RULER ASSEMBLY

[75] Inventor: Jay Clark V, St. Pete, Fla.

[73] Assignee: The Fastalign Ruler Company, Clearwater, Fla.

[21] Appl. No.: 644,988

[22] Filed: May 9, 1996

[51] Int. Cl.[6] ................................ G01B 5/14; G01B 3/10

[52] U.S. Cl. ................................ 33/481; 33/1 B; 33/1 BB

[58] Field of Search ........................... 33/481, 1 B, 1 BB, 33/429, 474, 484, 493

[56] References Cited

U.S. PATENT DOCUMENTS

| | | | |
|---|---|---|---|
| 1,214,785 | 2/1917 | Hill | 33/1 B |
| 2,375,427 | 5/1945 | Mannino | 33/1 B |
| 2,992,484 | 7/1961 | May | 33/1 B |
| 3,842,506 | 10/1974 | Pascua et al. | 33/1 B |
| 4,422,241 | 12/1983 | Meeker | 33/1 BB |
| 4,475,288 | 10/1984 | Pellegrom | 33/1 B |
| 4,607,433 | 8/1986 | Meeker | 33/1 BB |

*Primary Examiner*—Christopher W. Fulton
*Attorney, Agent, or Firm*—Fish & Richardson P.C.

[57] ABSTRACT

A ruler assembly comprises a transparent overlay, an L-shaped flange having transverse and parallel legs, and fasteners for attaching the overlay to the flange. The overlay is attached to the parallel leg of the flange such that the edge of the overlay along its length is adjacent to the transverse leg of the flange.

21 Claims, 4 Drawing Sheets

RULER ASSEMBLY

BACKGROUND

This invention relates to rulers and paper alignment schemes.

In the printing industry, it can be important to have the text of printed material accurately aligned with the paper that it is printed on. One known way for aligning printed text with the paper that it is printed on is with the use of a standard ruler or straight edge. A standard ruler or straight edge is typically used by printers and press operators for determining if printed text is parallel with the edge of its print medium. The printer or press operator takes measurements by hand at several points along a line to determine if the text or printed material is aligned to the edge of the paper.

Another known way of aligning printed text or printed material on its print medium is through the use of a light table. A light table is a glass table with an illumination source beneath the glass with a ruler physically attached to the edge of the table. The ruler can be slid along the side edge of the table, while keeping the ruler perpendicular to the bottom edge of the table. Light tables are large, expensive and fragile, but are accurate in aligning text to the edge of a print medium.

SUMMARY

In general, in one aspect, the invention features a transparent overlay, having grid lines to match standard printing measurements, an L-shaped flange or other alignment stop, and fasteners for attaching the overlay to the alignment stop.

Implementations of the invention include the following features. The transparent printed overlay may be of a plastic material. An L-shaped flange may be used to secure an edge of the overlay. The overlay may be printed or embossed with grid markings at standard printing measurements along its length and width.

Advantages of the invention include one or more of the following features. The ruler allows for a simple, inexpensive and accurate way to align printed text on its print media. A printing press operator may easily align the edge of a piece of paper with the edge of a ruler. The ruler is large enough to align large printed items, yet is small enough to be hand held. The ruler allows for the alignment of multiple lines of text at a time. An embodiment of the ruler also permits quick and easy checking of centering of text on a page.

Other advantages and features will become apparent from the following description and from the claims.

DESCRIPTION OF THE PREFERRED EMBODIMENTS

Figure 1:
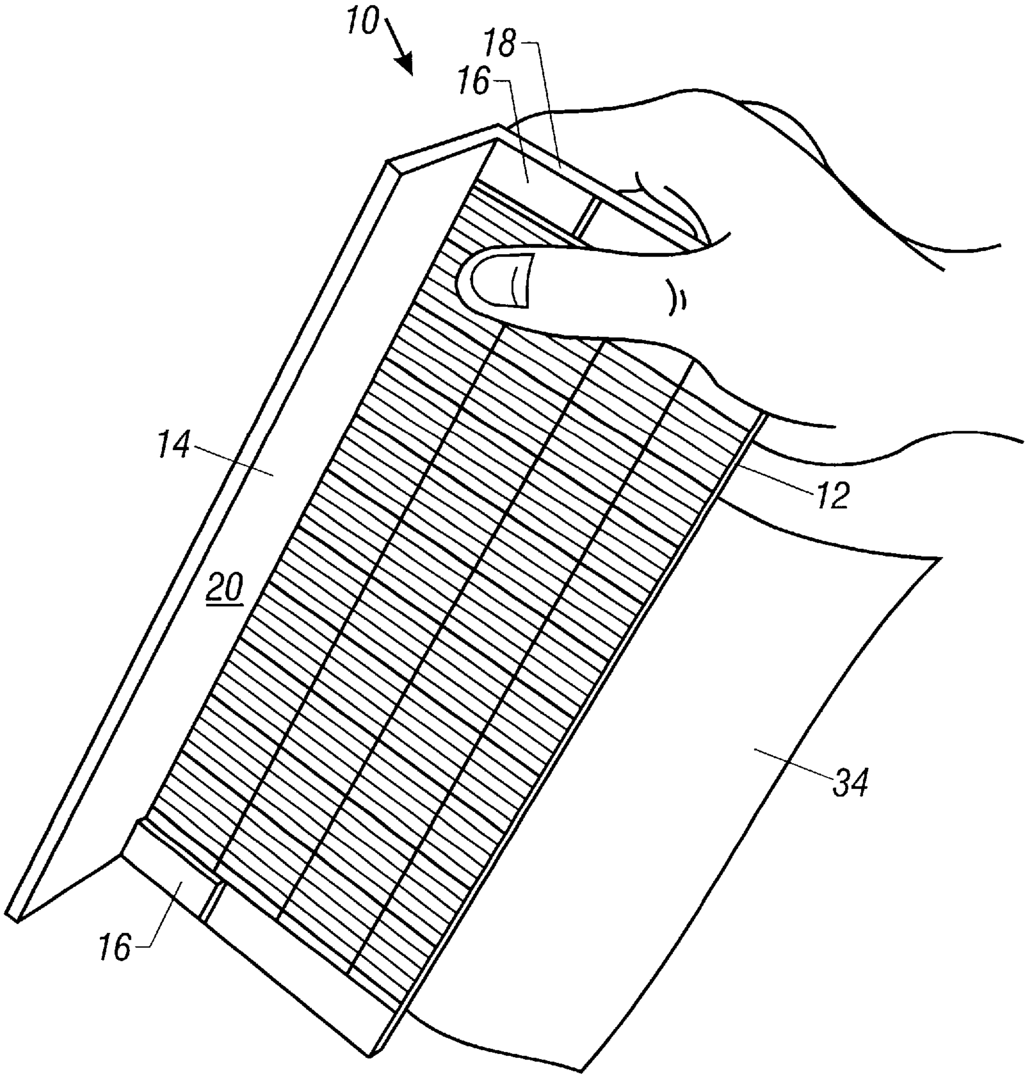
FIG. 1 is a perspective view of an embodiment of the ruler assembly.
Figure 3:
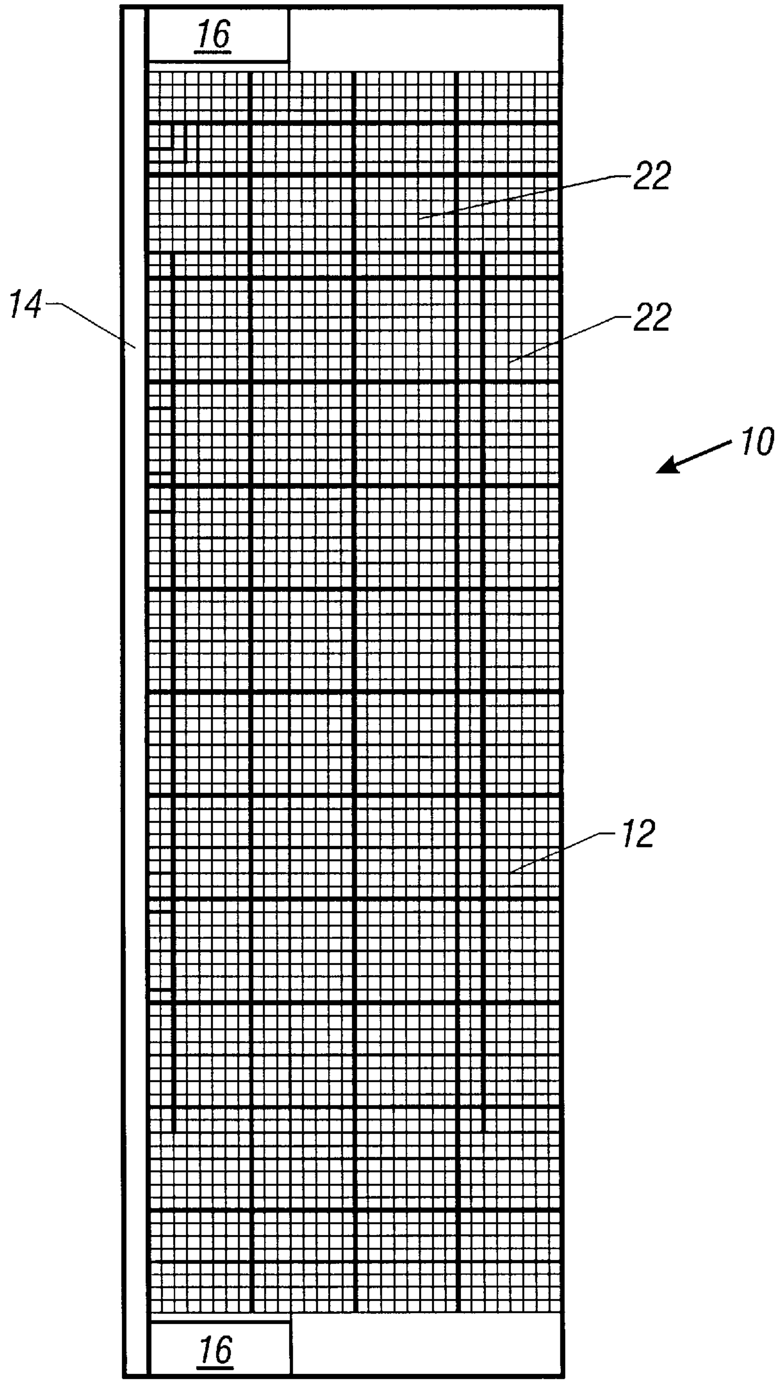
FIG. 3 is a top view of the ruler assembly.
Figure 4:
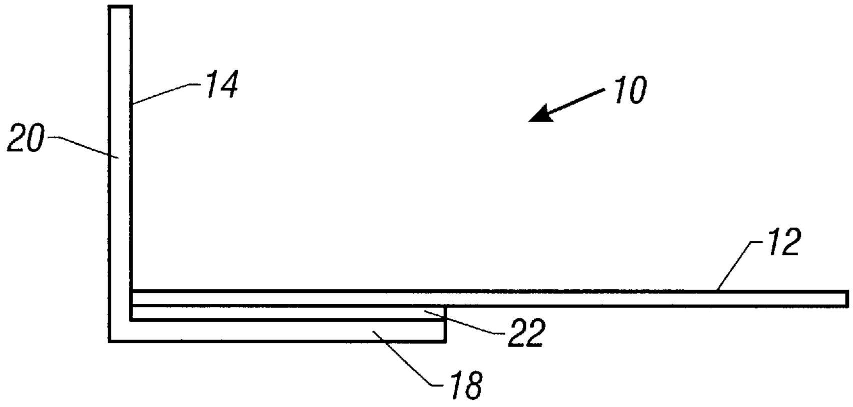
FIG. 4 is a side view of the ruler assembly.

In the ruler assembly 10 of FIGS. 1, 3 and 4, a transparent sheet or overlay 12 is placed parallel and adjacent to an alignment stop, which is shown as an L-shaped flange 14. The transparent sheet 12 is secured to the flange 14 with fasteners. The fasteners may be tape, glue, rivets or other attachment means, and are shown in the Figures as double sided adhesive spacers 16. The L-shaped flange 14 includes a parallel leg 18 (which is parallel to the overlay) and a transverse leg 20. Preferably, the parallel and transverse legs 18 and 20 are perpendicular to each other. In one example, the L-shaped flange 14 is made of aluminum and has architectural angles. Preferably, the fasteners 16 maintain the overlay 12 at a slight distance from the parallel leg 18 of L-shaped flange 14.

Figure 2:
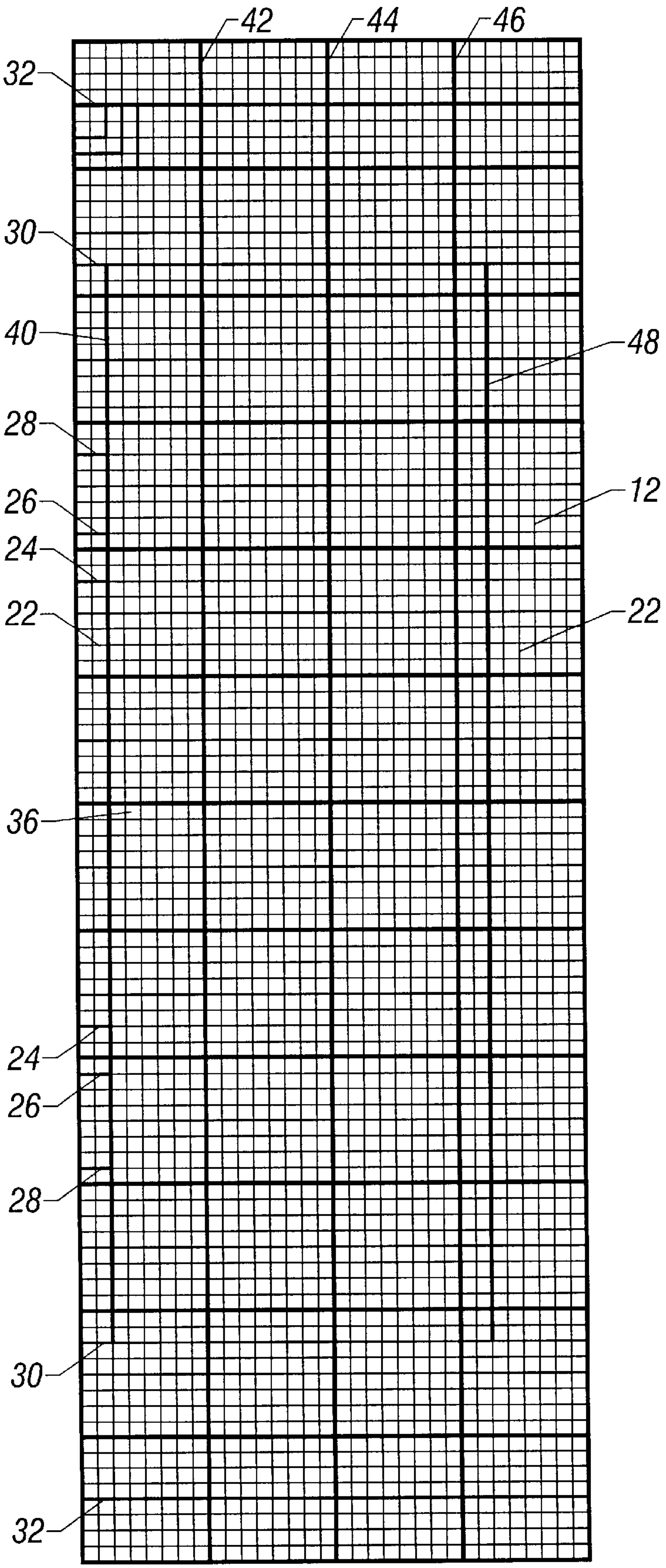
FIG. 2 is a top view of the ruler element of the assembly.

As shown in FIG. 2, the transparent sheet or overlay 12 includes grid-like markings 22 placed at certain distances across the overlay 12. The transparent overlay 12 is approximately the same length as the flange 14. Preferably, the transparent overlay 12 is made of a flexible, lightweight plastic material such as Lexan®.

In one example, the flange 14 is 13¼" long and ⅛ thick, with each leg 18 and 20 of the L-shaped flange 14 being 1½ in width. The transparent overlay 12 is also 13¼" in length and is 4" wide and 0.06" thick. Fasteners 16 are two pieces of 3M® VHB two-sided tape that are each ½" wide and 1½" long, and are used to secure the overlay 12 to the flange 14.

The overlay 12 includes a unique grid pattern having markings 22 at specific points along the overlay for use in aligning particular print material. Specifically, the overlay 12 has pairs of special markings of 3½", 4¼", 5½"", 8½" and 11" along its length at points 24, 26, 28, 30, and 32, respectively. These points 24, 26, 28, 30 and 32 are spaced such that a print medium 34 of a particular width may be positioned between points that indicate the width of the print medium. The pairs of points 24, 26, 28, 30 and 32 are each equally spaced from a center point 36. For example, a pair of 8½" points 30 are spaced 8½" apart and are positioned about center point 36 of overlay 12. Each of the points 24, 26, 28, 30 and 32 along the length of the overlay 12 is spaced in this fashion.

The overlay 12 may include additional markings 22 along its width. For example, in one embodiment, the overlay includes markings of ¼, 1", 2", 3" and 3 ¼" positions at points 40, 42, 44, 46 and 48, respectively. These additional points 40, 42, 44, 46 and 48 are spaced their measured distance from flange 14; they represent the corresponding distance from the side of the overlay 12 that is adjacent flange 14.

As shown in FIG. 1, the ruler assembly 10 may be used to simply and accurately align typeset on a piece of print media 34. A piece of print media 34 is inserted between the print overlay 12 and the flange 14. One edge of the print media 30 is aligned against the transverse leg 20 of flange 14. The other edges of the print media 34 are aligned between the applicable grid markings 22 along the length of the overlay 12. For example, an 8½"×11" piece of paper, on which printed material 34 is positioned in a vertical orientation on the paper, would be aligned between the 8½" grid points 30 on the grid overlay 12. With the paper correctly aligned, the user can observe the position of the printing on the print media 34 relative to the markings 22 along the overlay 12. The ruler assembly 10 can be easily used to align and center typeset on paper, stationery, envelopes, business cards, and other printed media.

The dimensions of the ruler assembly 10 can be made larger or smaller, depending on the application. For example, in one embodiment, the grid overlay is 18"×6". In addition, the overlay may be provided with standard metric or European grid markings or other units of measurement.

While the invention has been described with respect to the preferred embodiments, in accordance therewith, it be apparent to those skilled in the art that various modifications and improvements may be made without departing from the scope and spirit of the invention. Accordingly, it is understood that the invention is not to be limited by the specific illustrated embodiments.

What is claimed is:

1. A ruler assembly comprising:

a transparent overlay;

a one-piece flange having a transverse and parallel legs; and fasteners attaching the overly to the horizontal leg of the flange such that the length of the overlay is adjacent the transverse leg of the flange, wherein the overlay includes grid markings along its length.

2. The ruler assembly of claim 1 wherein the overlay includes grid markings along its width.

3. The ruler assembly of claim 2, wherein the grid markings along the width of the overlay are at one or more of the following measurements, ½", 1", 2", 3", 3¼".

4. The ruler assembly of claim 2, wherein the grid markings along the length of the overlay are at measurements of 3½", 4¼" 5½ 8½", and 11" and the grid markings along the width of the overlay are at ½", 1", 2", 3", and 3 ¼".

5. The ruler assembly of claim 1 wherein the grid markings along the length of the overlay are at one or more of the following measurements, 3½, 4¼", 5½", 8½", 11".

6. The ruler assembly of claim 1, wherein the fasteners maintain the overlay above the parallel leg of the flange.

7. The ruler assembly of claim 1, wherein the flange and overlay are approximately the same length.

8. The ruler assembly of claim 1, wherein the transverse and parallel legs of the flange are approximately the same height.

9. The ruler assembly of claim 1 wherein the grid overlay is made of a transparent, plastic sheet of material.

10. The ruler assembly of claim 1 wherein the flange is made of aluminum.

11. The ruler assembly of claim 1 wherein the flange is L-shaped.

12. The ruler assembly of claim 1 wherein the fasteners are double-sided tape.

13. The ruler assembly of claim 1 wherein the overlay is 13¼" long and 4" wide.

14. The ruler assembly of claim 1 wherein the overlay is 18" long and 6" wide.

15. The ruler assembly of claim 1 wherein the grid markings on the overlay are printed on the side of the overlay adjacent to the horizontal edge of the flange.

16. A method of using a paper alignment assembly for aligning typeset on print media, the steps comprising:

inserting the print media between a transparent overlay having grid markings and a one-piece flange;

aligning a first edge of the print media with a first edge of the overlay;

viewing the typeset on the print media through the grid markings on the overlay; and adjusting the typeset on the print media if the typeset is not in alignment.

17. The method of claim 16, wherein the flange is L-shaped.

18. The method of claim 16, wherein the flange is fastened to the overlay.

19. The method of claim 16, wherein the print media is a piece of paper.

20. The method of claim 16, wherein the print media is an envelope.

21. The method of claim 16, wherein the print media is a business card.

* * * * *

UNITED STATES PATENT AND TRADEMARK OFFICE
CERTIFICATE OF CORRECTION

PATENT NO. : 5,768,791

DATED : June 23, 1998

INVENTOR(S) : Jay Clark, V

It is certified that error appears in the above-identified patent and that said Letters Patent is hereby corrected as shown below:

On the title page, items [19] and [75] "V" should read --Clark-- and "Jay Clark V," should read --V Jay Clark--.

Column 2, line 15, insert --"-- after "1/8";

Column 2, line 16, insert --"-- after "1 1/2";

Column 2, line 37, insert --"-- after "1/4";

Column 2, line 66, insert --will-- after "it"; and

Column 3, line 25, insert --"-- after "3 1/2".

Signed and Sealed this

Seventeenth Day of November, 1998

*Attest:*

BRUCE LEHMAN

*Attesting Officer*

*Commissioner of Patents and Trademarks*